United States Patent [19]

Belko et al.

[11] 4,150,920
[45] Apr. 24, 1979

[54] ROTOR BLADE TIPWEIGHT ASSEMBLY

[75] Inventors: Raymond P. Belko, Blackwood, N.J.; Robert C. Huss, Glen Mills, Pa.

[73] Assignee: The United States of America as represented by the Secretary of the Army, Washington, D.C.

[21] Appl. No.: 856,715

[22] Filed: Dec. 2, 1977

[51] Int. Cl.² .............. B64C 11/16; B64C 27/46
[52] U.S. Cl. ............................. 416/145; 416/226
[58] Field of Search .............. 416/144, 145, 134 A, 416/230, 226, 228 R, 228 A, 500

[56] References Cited

U.S. PATENT DOCUMENTS

| 2,430,948 | 11/1947 | Platt | 416/144 |
|---|---|---|---|
| 3,018,832 | 1/1962 | Prewitt | 416/144 |
| 3,103,977 | 9/1963 | Negroni | 416/145 |
| 3,237,697 | 3/1966 | Ford et al. | 416/144 |
| 3,310,117 | 3/1967 | Slivinsky et al. | 416/144 X |
| 3,323,597 | 6/1967 | Longobardi et al. | 416/144 |
| 3,999,888 | 12/1976 | Zincone | 416/224 X |

FOREIGN PATENT DOCUMENTS 113408  3/1945  Sweden ......................... 416/144

*Primary Examiner*—Everette A. Powell, Jr.
*Attorney, Agent, or Firm*—Nathan Edelberg; Norman L. Wilson, Jr.

[57] ABSTRACT

Helicopter rotor blades require tip weights for spanwise and chordwise balance to assure that all of the blades rotate in the same track. The improved rotor blade tip weight assembly of the present invention comprises an elongated spar, preferably formed of a reinforced plastic, adapted to be connected at one end thereof to a rotor hub. An aft fairing structure is carried by the spar and a balancing weight assembly is bonded and/or cured in place within the spar, proximate the free end thereof. The balancing weight assembly includes, in the preferred form thereof, a fiberglass weight tube housing having a pair of internally threaded weight tubes positioned therewithin. The weight tubes form bores having longitudinal axes in a common, substantially horizontal plane, and the axes each extend in a direction parallel to the axis of the spar. One or a plurality of externally threaded cylindrical weights are locked in each weight tube during balancing of the rotor blade.

3 Claims, 3 Drawing Figures

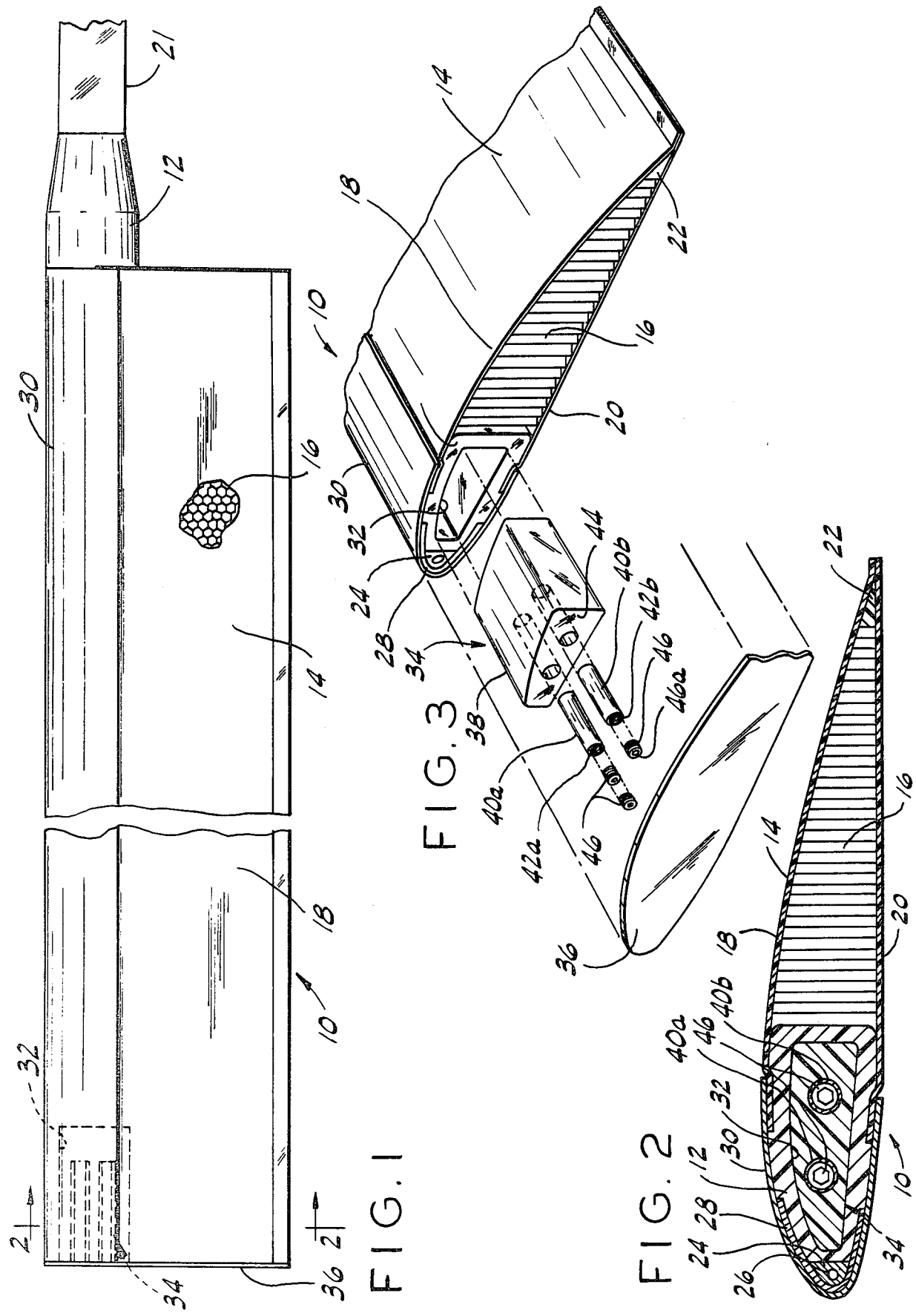

ROTOR BLADE TIPWEIGHT ASSEMBLY

BACKGROUND OF THE INVENTION

It is well known that aerodynamic rotor blades utilized for helicopter flight require tip balancing for spanwise and chordwise balance. Existing rotor blades generally have fittings riveted directly to the rotor blade spar, and moveable weights are mounted, usually with studs and nuts, to the tip weight fitting. The prior art assemblies require a multitude of parts, i.e., plates, mounting studs, and nuts, all of which parts require expensive casting and/or machining, and which require drilling and riveting for securing the weight assembly in place. Further, in the prior art designs, the entire force acting upon the tip weight as the rotor blade revolves is transferred usually upon a single stud which may fail and produce a hazardous situation.

Recently, there has been an emphasis on producing blades from a composite assembly of a reinforced plastic. It is therefore especially difficult to install tip weight assemblies comprised of plates, mounting studs, and nuts onto reinforced plastic spars to produce reliable and safe rotor blades.

SUMMARY OF THE INVENTION

The present invention relates to an improved rotor blade tip weight mounting assembly which is conducive of facile fabrication, simplified rotor blade balancing, and utmost reliability and safety. The improved weight mounting assembly is particularly useful in balancing rotor blades embodying reinforced plastic spars since the entire balancing weight assembly may be bonded and/or cured in place within the rotor blade spar during fabrication of the rotor blade composite assembly; and, therefore, the necessity for riveting is dispensed with.

According to the principles of the present invention, the rotor blade spar is adapted to be connected at one end thereof to a rotor hub and the free end of the blade is provided with a cavity for the insertion, and the ultimate bonding and/or curing therewithin, of the improved balancing weight assembly. The improved balancing weight assembly includes a main housing which is preferably formed of fiberglass and which can be bonded and/or cured in place within the aforementioned rotor blade cavity. According to the preferred embodiment of the invention a fiberglass housing has bonded and/or cured therewithin a pair of internally threaded, elongated, metal tubes, depending upon spar balance, which tubes have longitudinal axes which lie in substantially the same horizontal plane and which are parallel to the longitudinal axis of the rotor spar. One or a plurality of cylindrical, externally threaded weights are matingly screwed into each of the weight tubes and locked in place with a locking nut. The weights thus provide an infinitely variable weight distribution within the weight tubes and within the rotor tips. A rotor blade tip cover is removably secured to the rotor tip face, and when it and the locking nut are removed, the cylindrical tip weights may easily be removed or added to the weight tubes by use of, for example, an Allen wrench. If necessary the tip cover and locking nut may at any time again be removed, thus allowing for the continued adjustment of the weight positions and correction of the rotor balance.

It is therefore a main object of the invention to provide an improved rotor blade tip weight mounting assembly which may be more simply economically fabricated and installed within a rotor blade spar, especially a spar formed of fiberglass and like materials, and which will more safely and reliably balance the rotor blade.

It is another main object of the invention to provide a safer rotor blade tip weight mounting assembly of simplified fabrication and weight adjustment.

BRIEF DESCRIPTION OF THE DRAWINGS

The above objects as well as other objects and advantages will become more apparent upon a reading of the hereinbelow described preferred embodiment of the invention in conjunction with the drawings wherein:

FIG. 1 is a top plan view of a helicopter rotor blade illustrating the basic position of the improved rotor blade tip weight mounting assembly of the present invention which is shown in dashed line.

FIG. 2 is a cross-sectional view of the rotor blade of FIG. 1 taken along the line 2—2 of FIG. 1.

FIG. 3 is a perspective exploded view of the rotor blade tip.

DESCRIPTION OF THE PREFERRED EMBODIMENT

With reference to the drawings, and FIG. 1 in particular, there is shown a rotor blade 10 including in its essential parts a spar 12, and an aft fairing structure 14 carried by spar 12. As shown in FIGS. 2 and 3, spar 12 is formed generally as a rounded D-shaped structure in cross section with a spanwise transition to a generally rectangular root end portion 21 (FIG. 1), which is adapted to be fitted into a rotor hub in any conventional manner (not shown). The spar 12 is tubular and acts as the predominate load-bearing member of blade 10 and, therefore, serves as a carrier to which all other elements are attached to form the blade. Because the spar serves as a carrier, its outer surface is shaped to accomodate the other elements of the blade so that in cross section, the blade presents an air-foil shape.

The aft fairing structure 14 includes typically a lightweight core 16, made preferably of foam or honeycomb, an upper skin member 18, a lower skin member 20, and in most cases, a trailing edge wedge 22 positioned between the aft portions of upper skin member 18, lower skin member 20 and core 16.

The forward portion of the blade assembly is preferably comprised of a nose block 24, having a spanwise extending bore 26 extending therethrough into which a counterweight (not shown) is inserted. Typically, a deicing blanket 28 is positioned over the forward portions of spar 12 and nose block 24, and a cap member 30 is placed over the forward surfaces of the blade in such a manner as to present a smooth air-foil shape along with upper skin member 18 and lower skin member 20, as best shown in FIGS. 2 and 3. The cap member 30 is preferably made of metal, such as titanium, although it may be made of any non-metallic material capable of protection against erosion.

Due to the tubular construction of spar 12, proximate the free-end portion of spar 12, there is formed a cavity 32 into which there is inserted a balancing weight assembly 34, constructed according to the principles of the present invention. After the blade 10 is balanced utilizing balancing weight assembly 34, as will be explained in detail hereinafter, the exposed free-end tip of the blade is closed by a conventional tip cover 36, which has a planar configuration which matches the vertical cross-section of the free end of blade 10, thereby preserving the air-foil configuration of the blade.

As shown in FIGS. 2 and 3, balancing weight assembly 34 includes a weight tube housing 38, preferably formed of fiberglass. Housing 38 has an exterior surface configuration which matches that of, and which may be snugly inserted within spar cavity 32. Thereafter, weight tube housing 38 may be bonded and/or cured in place within spar cavity 32 in order to produce a unitized structure. Preferably, a pair of weight tubes 40a and 40b are fixed within weight tube housing 38 as by bonding or curing in place. Weight tubes 40a and 40b are positioned within substantially the same horizontal plane and each of the tubes has a longitudinal axis parallel to the longitudinal axis of spar 12. Further, tubes 40a and 40b are internally threaded along the entire length thereof, and each has one end face 42a and 42b respectively, coincident with free-end face 44 of weight tube housing 38. Within weight tubes 40a and 40b are placed one or a plurality of short cylindrical weights 46, sufficiently small say one-fourth pound, so that several can be screwed into weight tubes 40a or 40b. Weights 46 are externally threaded with threads which matingly match the internal threading of tubes 40a and 40b so that the weights may be rotated and screwed into tubes 40a or 40b. A hexagonal blind bore 46a on the end face of each weight 46 permits the use of, for example, an Allen wrench for turning weights 46 within tubes 40a or 40b, and thus position weights 46 independently to a desired point along the length of tubes 40a and 40b. Further, the threading of weights 46 and tubes 40a and 40b are machined such that they mate in a manner so as to produce fit engagement, therefore preventing the weights 46 from moving within tubes 40a or 40b after the weights 46 have been positioned with an Allen wrench to the desired locations which provide both spanwise and chordwise balance for blade 10. The balancing procedure is well known and need not be explained in detail herein. Basically weights 46 are screwed into tubes 40a and 40b in sufficient numbers to statically balance blade 10. The blade is then dynamically balanced by moving weights from one tube to the other. After weights 46 have been positioned to balance blade 10 a light weight plastic threaded check nut (not shown) is screwed into each tube to hold the weights in place. Tip cover 36 is then placed over the exposed end of blade 10 and attached thereto in any well-known manner.

From the foregoing description it can be seen that an improved rotor blade tip weight mounting assembly is provided which may be more simply and economically fabricated and installed within a rotor blade spar, especially a spar formed of fiberglass and like materials. The invention provides a more safely and reliably balanced rotor blade. It is clear also that the assembly of the present invention provides for a most simplified fabrication and allows for a simplified weight adjustment free of expensive cast and/or machined parts with no studs, nuts, or lockwire as required in the prior art balancing assemblies.

Numerous modifications may be made to the construction and design of the present invention without departing from the spirit and scope thereof. Thus an additional weight tube can be added to core section 16. Such ramifications are deemed to be within the scope of this invention.

What is claimed is:

1. A rotor blade balancing weight assembly secured within the rotor blade spar proximate the free-end thereof, said balancing weight assembly including a weight tube housing, a cylindrical weight tube fixed within said housing, positioned with its longitudinal axis parallel to the longitudinal axis of the spar, said weight tube being internally threaded, forming an internally threaded bore, cylindrical balancing weights within the weight tube, said weights having outside diameter equal to the inside diameter of the weight tube, said weights being externally threaded with threads which matingly match the internal threads of the weight tube, the threads being such that a fit engagement is obtained preventing a weight from moving within the weight tube while allowing the weights to be positioned independently within the weight tube to provide both spanwise and chordwise rotor blade balance, means for turning the weights within the tubes to position them within the tube, and a blade tip cover member covering the free-end tip of the spar.

2. The balancing weight assembly of claim 1 including two threaded weight tubes fixed within the weight tube housing, each of said weight tubes having a longitudinal axis parallel to the axis of the spar, said tubes being positioned within a common plane, and threaded weights within the tubes.

3. The balancing weight assembly of claim 1 wherein the spar is formed at least in part of fiberglass.

* * * * *